July 2, 1940.  A. P. FERGUESON  2,206,531
BRAKE LEVER
Original Filed March 11, 1938   2 Sheets-Sheet 1
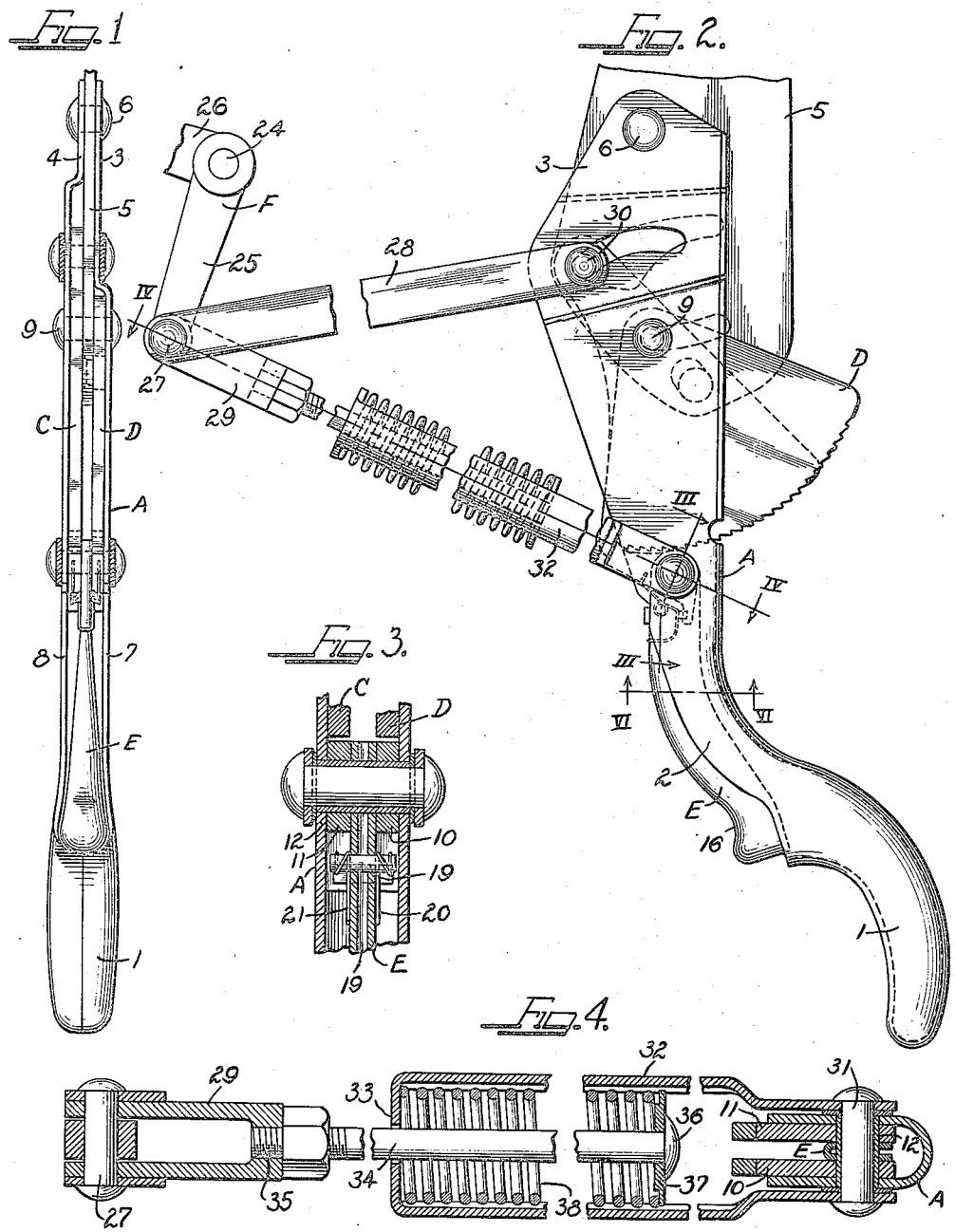
Inventor
ARTHUR P. FERGUESON

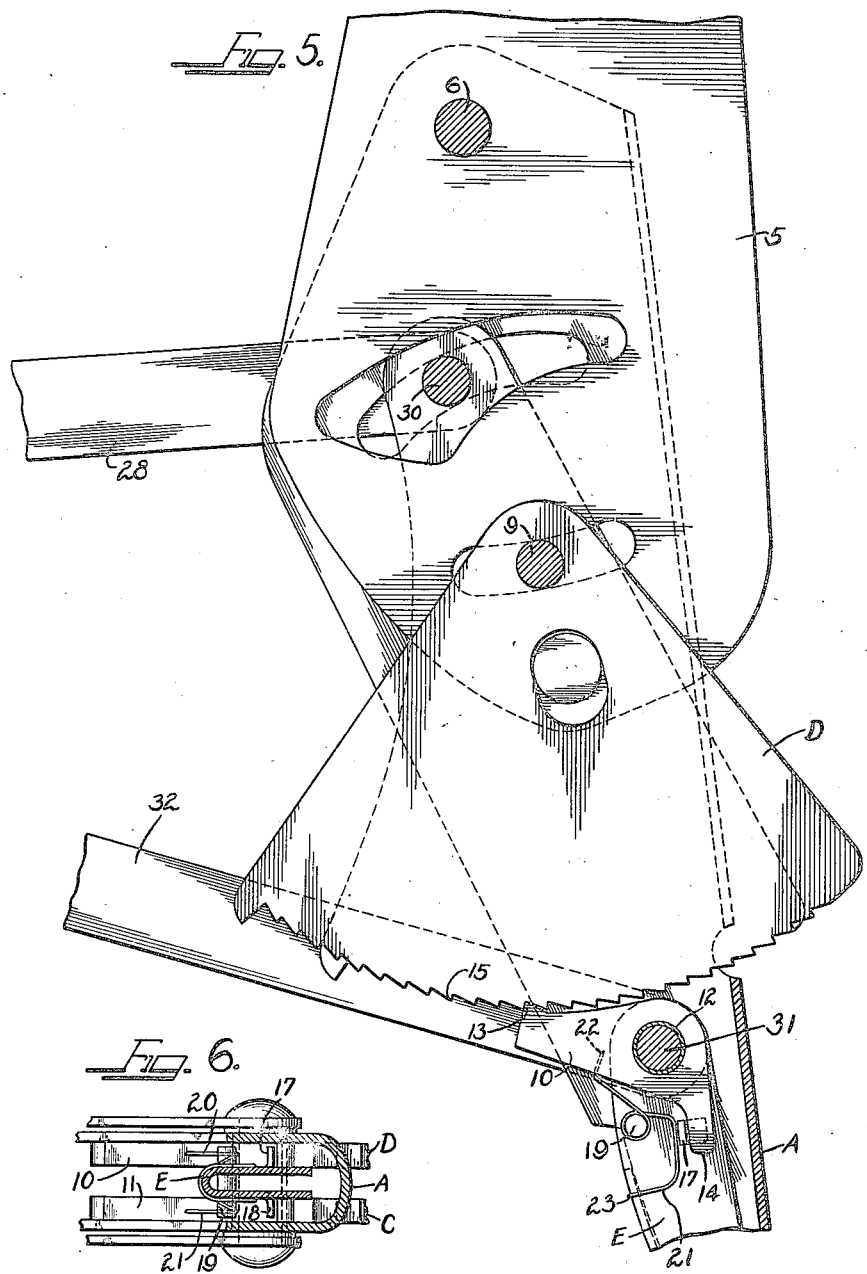

Patented July 2, 1940

2,206,531

UNITED STATES PATENT OFFICE 2,206,531

BRAKE LEVER

Arthur P. Fergueson, Detroit, Mich., assignor to Houdaille-Hershey Corporation, Detroit, Mich., a corporation of Michigan Original application March 11, 1938, Serial No. 195,239. Divided and this application June 10, 1939, Serial No. 278,468

7 Claims. (Cl. 74—537)

The present invention relates to brake lever and more particularly to a novel manner of mounting a rockable clutching member and a clutch release member on a lever member on a common axis.

The present application is a division of applicant's copending application Serial No. 195,239, filed March 11, 1938.

An object of the present invention is to provide a brake lever construction in which a rockable clutch member carried by the lever member is pivoted thereto on an axis which is in common with the axis of the pivotal connection of the clutch release member to the lever member.

A further object of the present invention is to provide a brake lever construction in which a clutch release member and a clutching member are pivotally mounted on a lever member on a common axis and in which relative motion or rocking movement may occur between the clutch member and the release member.

A further object of the present invention is to improve brake lever construction in a manner whereby manufacturing costs may be reduced without in any manner affecting the strength or mode of operation of the finished product.

Generally speaking, the present invention contemplates a mounting of a clutch member on a lever member on a pivot so that the clutch member may rock in service and also in mounting on the same pivot a clutch release member which is operable to effect disengagement of the clutching member from its cooperating clutching member whereby the lever member may be moved to adjusted position.

The accompanying drawings illustrate features present in applicant's copending application and also illustrate an embodiment of the present invention. It is to be understood that while the accompanying drawings illustrate two clutching members mounted on the pivot, both operable by a clutch release member mounted on the same pivot, the invention contemplates the utilization of a single clutching member, as coming within the purview of the present invention.

The accompanying drawings illustrate but one embodiment of the present invention, and the views thereof are as follows:

Figure 1 is a side elevational view of a brake lever of the character illustrated in applicant's said copending application, and with which the present invention may be employed.

Figure 2 is a side elevational view of the brake lever of Figure 1, with parts broken away, and showing in dotted lines the cooperative relationship of the rockable clutch member and clutch release member.

Figure 3 is an enlarged fragmental view taken substantially in the plane indicated by the line III—III of Figure 2.

Figure 4 is an enlarged, fragmental, longitudinal view taken substantially in the plane indicated by the line IV—IV of Figure 2.

Figure 5 is a fragmental elevational view, with parts in section, showing the relative arrangement of certain parts of the brake mechanism of applicant's copending application, and showing in full lines the relationship of the pivot end of the clutch release member and a clutching member, coaxially pivoted to the lever member.

Figure 6 is an enlarged sectional view taken substantially in the plane indicated by line VI—VI of Figure 2.

The drawings will now be explained.

The brake lever member, herein generally designated as A, is illustrated as fashioned as a stamping with a shank portion of substantially U-shaped configuration in cross section and a curved closed hollow grip or handle portion 1 offset laterally, in side elevation, from the general length of the shank of the lever member. At the fulcrum end the lever is illustrated as having spaced legs 3 and 4 straddling a supporting plate 5, a fragmental portion of which is illustrated. The fulcrum ends of the legs are suitably apertured to take a pivot 6 for connecting the lever member A to the supporting plate 5 for swinging movement of the lever in service.

The plate is suitably secured to a proper foundation, which is applied behind the instrument board of an automotive vehicle, when the lever is mounted as one of the dash or cowl type.

The shank portion 2 of the lever member A has, in the form here illustrated, side walls 7 and 8.

The lever here illustrated is provided with two rockable floating sectors C and D, pivoted at 9 to the legs of the lever member, to swing about the pivot as the lever member is swung about its pivot 6, in service.

These floating sectors have their arcuate edges provided with ratchet teeth thus constituting cooperating clutching members with which the rockable clutching members 10 and 11, pivotally carried by the lever member, cooperate to hold the lever member in adjusted position.

The two clutching members 10 and 11 are pivoted to the side walls of the lever member A by means of a bushing 12 with the clutching members being arranged side by side on the bushing and adapted for independent rocking movement with respect to each other, also with respect to the clutch release member.

The clutching member 10 is here illustrated as a pawl having a detent or point 13 adapted to engage with any of the ratchet teeth 15 formed on the floating sector D. The clutching member is also provided with a tail portion 14.

A similar clutching member 11 cooperates with the ratchet teeth on the floating sector C.

A pawl release member E, herein shown as comprising a stamping of U-shape in section and assembled within the shank portion 2 of the lever member A and having a manipulating end portion projecting outwardly of said lever member shank in position to be grasped by forefinger of an operator to actuate the release member, is pivoted to the lever member A on the bushing 12, that is to say, coaxially with the clutch members 10 and 11. The lower extremity of the clutch release member E is herein shown as provided with a curved portion 16 as a seat for the forefinger of the vehicle operator when he desires to actuate the release member to disengage the clutching engagement of the clutching members for adjustment of the brake lever.

Member E is shown as provided with two lugs 17 and 18 disposed to engage the tail portions of the clutch members 10 and 11 respectively. These lugs are struck out of the side walls of the release member or might otherwise be formed.

While the release member is shown as provided with lugs for engaging the clutch members to disengage the clutch members from their cooperating clutch members to adjust the brake lever, it is to be understood that some other manner might be provided for cooperatively connecting the clutch release member with the clutch member for accomplishing this purpose.

Spring means are utilized to normally maintain the clutch members in engagement with their cooperating clutch members to hold the lever in adjusted position.

The spring means here illustrated comprise the following features:

A pin 19 is carried by the side walls of the clutch release member, adjacent the clutch members 10 and 11, with the ends of the pin extending beyond the side walls of the clutch release member. Carried on this pin is a spring 20 which engages the clutch member 10 to normally maintain it in latched engagement with the ratchet on the floating sector D. Similarly, another spring 21 is carried by the pin 19 and engages the other clutch member 11 to maintain it in engagement with the ratchet on the floating sector C. These springs engage the release member E with such action as to maintain the clutch members normally in latched engagement with the floating sectors and the release member E in normal position, that is, with its manipulating portion projected, for use, as shown in Figure 2.

If desired, additional spring means might be employed to maintain the clutch release member E in normal or projected position, that is, the position illustrated in Figure 2.

The springs 20 and 21 have herein been described as if these were separate members. They may be separate, and on the other hand may be parts of a single spring wire suitably bent and applied.

It will be observed that the ends of the springs which engage the clutch members 10 and 11 are entered in holes 22 formed in the clutch members, to prevent dislodgment of the springs from engagement with the clutch members. The springs while described as separate parts, are shown as constituting a unitary device, with a bight 23 bearing against the web portion of the release member E adjacent its pivoted end, as may be readily observed in Figure 5. In this arrangement portions of the spring bear against the lugs 17 and 18.

Referring to Figure 2, a bell crank F is carried on a shaft 24 suitably supported in bearings, not shown, behind the vehicle instrument board. The bell crank consists of two arms 25 and 26 respectively. The arm 26 is connected by suitable linkage to the brake mechanism of the vehicle while the arm 25 is pivoted at 27 to one end of a link 28 and also to one end of a clevis 29. The other end of the link 28 is pivoted at 30 to a pin which is connected to the upper end of the floating sector C.

Pivoted to the lever member by a pivot pin 31 extending through the bushing 12, is a U-shaped elongated strap 32 with the end of the strap remote from the pivot 31 apertured at 33 to receive a rod 34 which rod is connected at 35 to the clevis 29 and at the other end is headed at 36. The head bears against a follower 37. A spring 38 is confined between the follower 37 and the apertured end of the strap 32 which spring is susceptible of compression as the distance between the pivots 31 and 27 is increased, which occurs during certain steps of operation of the lever construction.

The arrangement of the parts illustrated in Figure 2, shows the same with the lever in "off" position. When the lever member is swung in brake applying direction, that is, counterclockwise as viewed in Figure 2, the connections between the lever and the bell crank F, that is, the strap 32, spring 38, rod 34 and clevis 29, swing the crank arm 25 in counterclockwise direction. This movement of the bell crank urges the link 28 to the right, thereby swinging the floating sector C in clockwise direction about its pivot 9. This swinging movement of the sector moves some of its ratchet teeth past its cooperating clutching member 11. As soon as the brake shoes contact the brake drums, load is put on the brake mechanism thereby restraining movement of the bell crank F in clockwise direction. Such restraint, through the linkage 28, tends to swing the floating sector C in counterclockwise direction. However, this tendency to swing is checked by engagement of the clutch member 11 with the ratchet teeth of the sector, thus locking the sector against such retrograde movement and in effect making the latched sector C, for the moment, an integral part of the lever member. The pull exerted by the brake lever E on the crank 25 of the bell crank F, under these conditions, transfers pull to the pivot 30 at the upper end of the arm or sector C, that is, to a point near the lever pivot, thus increasing the ratio, and enabling application of the brakes with a minimum of travel of the brake member. When the brake lever has been swung far enough to set the brakes, the clutch member 10 latches with its floating sector D to thus secure the lever in its adjusted position. The pivot 30, to which the linkage 28 is connected, may be said to be a traveling or floating pivot, which moves during the interval of time when there is substantialy no load on the crank F over and above that necessary to move the brake shoes against the drums.

To release the brakes, the operator actuates the release member E by engagement of his forefinger with the seat portion 16 squeezing the lower manipulating end of the release member which rocks the release member about its pivot, the bushing 12, thus tripping the clutch members 10 and 11 and freeing them from holding engagement with their respective sectors or ratchets, or cooperating clutch members to thereby enable the turn of the lever to its "off" position. During such return movement of the lever member, the floating sectors swing in counter clockwise direction.

During the movement of the brake lever to brake setting position, the operator grasps the handle portion 1 of the lever member swinging it in counter clockwise direction as viewed in Figure 2. Because of the fact that the clutch members 10 and 11, are so mounted on their pivot as to be rockable independently of the clutch member E, the clutch members, when pawls, bounce along the ratchet teeth without in any manner imparting oscillatory or vibratory motion to the clutch release member E. However, the arrangement of the parts is such that when it becomes necessary to release the clutch teeth from engagement with the lever, by manipulation of the clutch releasing member, but a slight movement of the manipulating end of the release member is necessary.

It will be observed that the present invention contemplates a lever construction in which a lever member is supported to swing, cooperating clutching members are provided for maintaining the lever member in adjusted position, one of said cooperating clutching members is pivotally carried by the lever member. In addition, a clutch release member is pivoted to the lever member on an axis in common with the clutch releasing member.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. A brake lever construction including a fixed support, a rigid lever member having a handle portion at one end and having its other end pivoted to said support to swing, cooperating clutch members, one of said clutch members being pivoted to said lever member by a pivotal connection other than the pivotal connection of said lever member to said support, a clutch release member pivoted to said lever member on said clutch member pivot, said clutch member being rockable on its pivot independently of said release member, said release member having a part engageable with said clutch member to disengage said clutch member from its cooperating clutch member when said release member is rocked in one direction on its pivot, and spring means for normally maintaining said clutch members in engagement.

2. Brake lever construction including a support, a rigid lever member having a handle portion at one end and having its other end pivoted to said support, cooperating pawl and ratchet means for maintaining said lever in adjusted position, said pawl being pivoted to said lever member and provided with a tail portion, a pawl release member pivoted to said lever member coaxially with said pawl and having a part adjacent the pawl tail formed to contact said tail and rock said pawl out of clutching engagement with the ratchet when said release member is actuated to unclutch said clutching members, pivotal connection of said pawl and said pawl release member being other than the pivotal connection of said lever to said support, and spring means for normally maintaining said pawl in engagement with said ratchet.

3. A brake control mechanism including a support, an elongated lever terminating at one end in a handle portion and being pivoted at its other end to said support, cooperating clutching members normally spring urged to holding relation to maintain said lever in adjusted position, a clutch release member, said clutch release member and a clutching member being separately pivoted to said lever member and on a common axis disposed at a point in longitudinally spaced relation to the pivotal connection of said lever with said support.

4. In combination, a mechanism control including a support, a lever member formed of sheet metal having legs straddling said support and thereto pivoted, said lever member having a body portion of substantially U-shape in cross section and terminating at one end in a handle portion, cooperating clutching members normally spring urged to holding relation to maintain said lever member in adjusted position, a clutch release member, said clutch release member and a clutching member being separately and independently pivoted to said lever member within the body portion and on a common pivotal axis.

5. A hand brake lever construction for automotive vehicles, in combination; a supporting plate; a stamping forming a lever member having a closed hollow grip portion at one end, an intervening shank portion of U-shape configuration in cross section, and spaced legs at the other end; said legs being pivoted to said plate astraddle the same; cooperating clutching members normally spring urged to engaged position to hold said lever member in adjusted position; one of said clutching members being pivoted to said lever member between the surfaces defined by the side walls of the shank and said legs; a clutch release member between the side walls of the shank and pivoted to said lever member coaxially with respect to said one clutching member; said clutching member and said clutch release member having disconnected cooperable engageable parts for disengaging said one clutching member from its cooperating clutching member when said clutch release member is rocked in one direction on its pivot; and said clutch releasing member having a part constituting a trigger disposed adjacent the lever member grip portion and operable by finger pressure for rocking said clutch release member in said one direction.

6. Hand brake lever construction for automotive vehicles, in combination; a supporting plate; a stamping forming a lever member having a closed hollow grip portion at one end, an intermediate shank portion of U-shape configuration in cross section, and spaced legs at the other end; said legs being pivoted to said plate astraddle the same; cooperating clutching members normally spring urged to engaged position to hold said lever member in adjusted position; one of said clutching members being pivoted to said lever member between the surfaces defined by the side walls of the shank and said legs; a clutch release member between the side walls of the shank and pivoted to said lever member coaxially with said one clutching member pivot; said one clutching member having a tail portion disposed for engagement by a part of said clutch release member for rocking said clutching member away from clutching engagement with its cooperating clutching member when said clutch release member is rocked in one direction on its pivot, and said clutch release member having a part constituting a trigger disposed adjacent the lever member grip portion operable by finger pressure for rocking said clutch release member in said one direction.

7. A brake lever construction including a lever member having a hollow shank, a clutching member and a clutch release member coaxially pivoted to said lever member within said hollow shank for relative rocking movement, said clutch release member having a part projecting from the hollow interior of the shank adjacent the lever member grip and constituting a trigger operable by finger pressure for manipulating said release member to disengage said clutching members.

ARTHUR P. FERGUESON.